(12) United States Patent
Bryan (10) Patent No.: US 10,788,170 B1
(45) Date of Patent: Sep. 29, 2020

(54) OPTICAL SYSTEMS FOR LINEAR LIGHTING

(71) Applicant: Elemental LED, Inc., Reno, NV (US)

(72) Inventor: Raymond G. Bryan, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 16/844,557

(22) Filed: Apr. 9, 2020

Related U.S. Application Data (63) Continuation-in-part of application No. 16/688,948, filed on Nov. 19, 2019.

(51) Int. Cl.
*F21K 9/69* (2016.01)
*H05B 45/10* (2020.01)
*H05B 45/395* (2020.01)
*F21V 5/00* (2018.01)

(52) U.S. Cl.
CPC ............... *F21K 9/69* (2016.08); *F21V 5/008* (2013.01); *H05B 45/10* (2020.01); *H05B 45/395* (2020.01)

(58) Field of Classification Search
CPC ...... F21S 4/28; F21V 5/04; F21V 5/08; F21K 9/27
See application file for complete search history.

(56) References Cited

U.S. PATENT DOCUMENTS

| | | | |
|---|---|---|---|
| 6,561,690 B2 | 5/2003 | Balestriero et al. | |
| 6,758,582 B1 * | 7/2004 | Hsiao | F21V 7/0025 362/302 |
| 7,070,310 B2 * | 7/2006 | Pond | F21V 29/75 362/545 |
| 7,857,482 B2 | 12/2010 | Reo et al. | |
| 7,926,985 B2 * | 4/2011 | Teng | F21V 29/70 362/373 |
| 8,070,329 B1 | 12/2011 | Bechtel et al. | |
| 8,616,723 B2 * | 12/2013 | Zhang | F21V 29/745 362/218 |
| 8,998,448 B2 * | 4/2015 | Chang | F21V 5/00 362/246 |
| 9,065,991 B2 | 6/2015 | Galstian et al. | |
| 10,078,180 B1 | 9/2018 | Wasserman et al. | |
| 2006/0256563 A1 | 11/2006 | Uke et al. | |
| 2009/0128738 A1 | 5/2009 | Matsumoto et al. | |
| 2009/0207586 A1 | 8/2009 | Arai et al. | |
| 2010/0277908 A1 * | 11/2010 | Hu | F21V 15/01 362/235 |

(Continued)

*Primary Examiner* — Julie A Bannan
(74) *Attorney, Agent, or Firm* — United IP Counselors, LLC (57) ABSTRACT

Optical systems for linear lighting, particularly linear lighting that is installed in a channel, are disclosed, as are light fixtures that use these optical systems. The optical systems have multiple optical elements, usually a first lens adapted to be positioned close to a strip of linear lighting installed in a channel, and a second lens adapted to be positioned farther from the strip of linear lighting. In some cases, the first optical element may be a diffuser. The two optical elements are optically aligned with one another such that light from the first optical element reaches the second optical element. The multiple optical elements may be adapted to physically support one another, and to engage with structure provided by the channel for securing a cover. Some optical systems may be adapted to compensate for variations in the color or intensity of the emitted light.

21 Claims, 11 Drawing Sheets

(56) References Cited

U.S. PATENT DOCUMENTS

| | | | |
|---|---|---|---|
| 2012/0051039 A1* | 3/2012 | Chang | F21K 9/69 |
| | | | 362/218 |
| 2013/0094200 A1* | 4/2013 | Dellian | F21V 3/02 |
| | | | 362/218 |
| 2013/0208473 A1 | 8/2013 | Palagashvili et al. | |
| 2016/0076706 A1* | 3/2016 | Rebman | F21V 5/007 |
| | | | 362/223 |
| 2016/0238202 A1* | 8/2016 | Mallory | F21V 5/04 |
| 2016/0377257 A1 | 12/2016 | Xu et al. | |
| 2017/0276323 A1 | 9/2017 | Umeda et al. | |
| 2018/0045387 A1* | 2/2018 | Roach | B60Q 1/2607 |
| 2018/0245754 A1 | 8/2018 | Gensler et al. | |

* cited by examiner

OPTICAL SYSTEMS FOR LINEAR LIGHTING

CROSS-REFERENCE TO RELATED APPLICATIONS

This application is a continuation-in-part of U.S. patent application Ser. No. 16/688,948, filed Nov. 19, 2019, the contents of which are incorporated by reference herein in their entirety.

TECHNICAL FIELD

The invention relates to optical systems for linear lighting.

BACKGROUND

Linear lighting is a class of lighting based on light-emitting diodes (LEDs). A strip of linear lighting includes a printed circuit board (PCB) on which are mounted a number of LED light engines, typically mounted at a regular pitch or interval along the PCB. The PCB in question may be rigid or flexible. By joining strips of PCB end-to-end, linear lighting may be made in arbitrary lengths.

Combined with an appropriate driver, linear lighting is used as a luminaire in its own right, as well as a raw material for the manufacture of other types of LED-based luminaires. One common way to make a finished luminaire is to mount a strip of linear lighting in a channel and cover it with a cover. The channel provides protection for the strip of linear lighting, and the cover may produce a range of desired lighting effects, ranging from direction to diffusion.

An LED light engine, as the term is used here, refers to one or more LEDs in a package. The package allows the light engine to be mounted on a PCB by a common technique, such as surface mounting. Depending on the nature of the light that is to be emitted, the package may be topped with a phosphor that absorbs the light emitted by the LEDs and re-emits that light in a desirable color or spectrum. In a typical commercial LED light engine intended to emit "white" light, the LEDs in question are blue-emitting LEDs, and the phosphor absorbs blue light and emits a broader spectrum of light that appears to the observer to be white light. The re-emitted light is not usually of a single color; in fact, the typical spectral power distribution of the light spans the visible light spectrum.

Most LED light engines have a natural beam width in the range of about 120°-130°, full-width, half-maximum. However, that beam width is not suitable for all applications, nor are the other natural or typical light-emitting characteristics of linear lighting. Despite the ubiquity of LED lighting in the market, systems for controlling the light output of LED linear lighting are still rudimentary.

SUMMARY OF THE INVENTION

Aspects of the invention relate to optical systems for linear lighting, particularly linear lighting that is installed in a channel. These optical systems have multiple optical elements, usually a first lens adapted to be positioned close to a strip of linear lighting installed in a channel, and a second lens adapted to be positioned farther from the strip of linear lighting. The two lenses are optically aligned with one another such that light from the first lens reaches the second lens. In optical terms, the first lens fills the aperture of the second lens.

The nature of the two lenses may vary from embodiment to embodiment. The first lens may be plano-convex, for example, while the second lens may be bi-convex. Two lenses may, e.g., form an Abbe condenser. In other embodiments, the first lens may be bi-concave while the second lens is bi-convex. In addition to their refractive properties, either or both of the two lenses may include diffusing properties, in order to mix light. For example, one surface of the first lens may have diffusing properties in order to mix light as close to the source as possible.

Physically, the first lens may be supported by feet or other such support structure that rest on the bottom of the channel, such that the first lens is just above the linear lighting. For example, the first lens may have an optically-active portion that is integrated into a platform. The platform may support the second lens, at least in part. The second lens itself may have depending legs that rest on the platform. Thus, the lenses of a multiple-lens system may be arranged so that they are supported in part by each other and in part by the cover-securing structure of the channel.

As another example, the first lens may be integrated into a platform that has laterally-extending, upswept wings that partially engage the cover-securing structure of the channel and at least partially support the second lens.

Other aspects of the invention relate to optical systems that also include multiple optical elements. In these optical systems, there is typically a first lens or optical element arranged to be closer to the LED light engines, and a second lens or optical element that is arranged to accept light from the first optical element. The second lens or optical element is also adapted to act as a cover for a linear lighting channel. In these aspects of the invention, the first lens is supported by the second lens: the two lenses have interengaging features, and the first lens hangs down from the second lens by means of upwardly-extending legs.

Yet other aspects of the invention relate to optical systems designed to compensate for non-uniform color emission and/or non-uniform light intensity across the light-emitting area of an LED light engine. In embodiments according to these aspects of the invention, the first lens or optical element has a narrow slit that transmits light and is otherwise optically opaque or occlusive. The narrow slit may be narrower than the light-emitting area of the LED light engine.

A further aspect of the invention relates to light fixtures and luminaires. These light fixtures and luminaires typically include a channel, a strip of linear lighting installed in the channel, and an optical system of the kind described above.

Other aspects, features, and advantages of the invention will be set forth in the following description.

DETAILED DESCRIPTION

Figure 1:
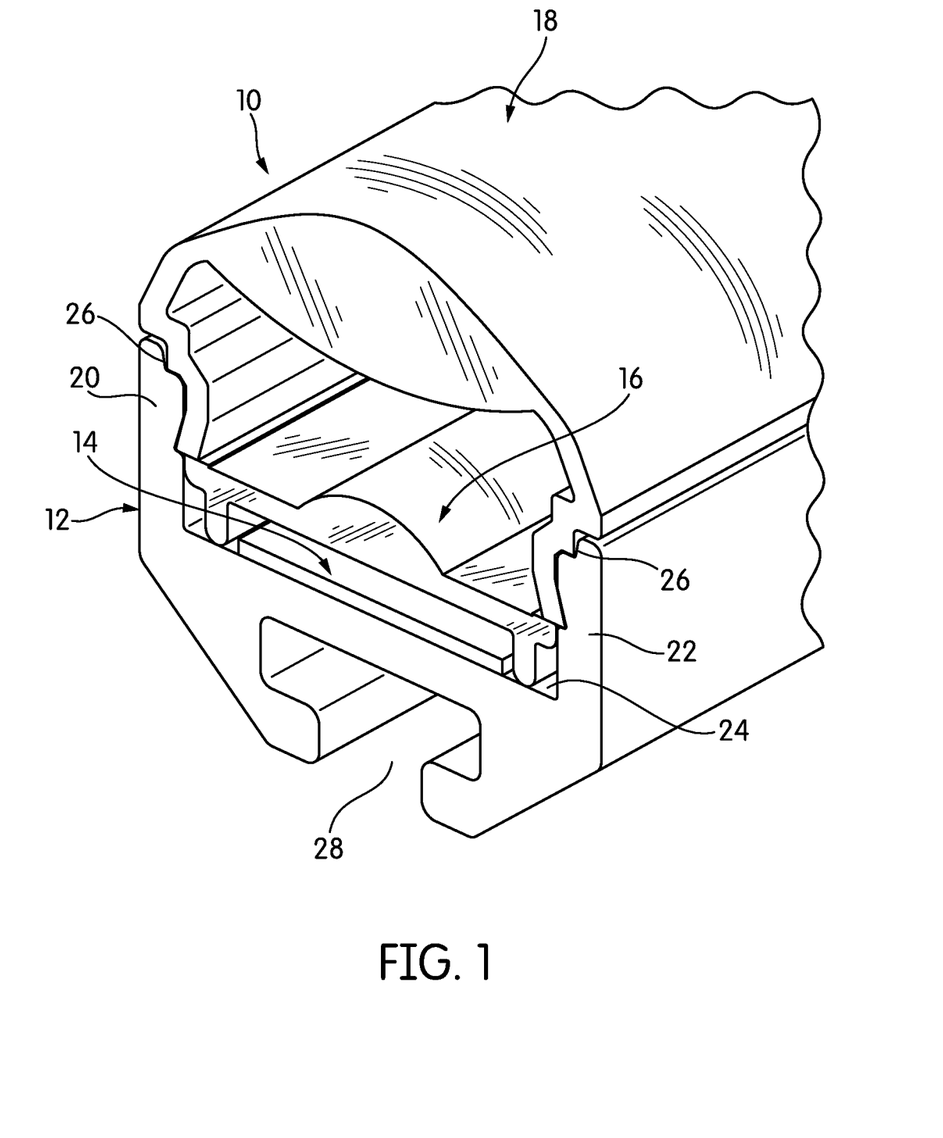
FIG. 1 is a perspective view of an optical system for linear lighting, shown as installed in a channel with a strip of linear lighting.

FIG. 1 is a perspective view of an optical system for linear lighting, generally indicated at 10, shown as installed in a channel 12 with a strip of linear lighting 14. In the illustrated embodiment, the optical system 10 comprises a first lens 16 and a second lens 18.

The term "lens" typically refers to a transparent structure with two opposite surfaces, at least one of which is curved, that is used to refract light. That basic definition of "lens" applies in this description. However, as will be described below in more detail, the first lens 16 and the second lens 18, as well as other lenses according to embodiments of the invention, include additional structure that is not optically active, i.e., it is not used to refract light. Thus, the lenses described here have optically active and non-optically active portions, and the term "lens" should be read as a general term that encompasses both portions, unless one or the other is specified. Additionally, as will be described in more detail below, in some embodiments, one or both lenses may not be transparent.

As may be apparent from FIG. 1, the terms "first" and "second," when used with respect to the lenses 16, 18 in this detailed description, refer to the order in which light strikes the lenses 16, 18 when the optical system 10 is in use. Other terms, such as "inner" and "outer," may be used in the same way, with the inner lens 16 being the first to receive light and the outer lens 18 being the second to receive light when the optical system 10 is in use.

The optical system 10 is designed to be mounted into and to be used with traditional linear lighting channels. These channels are typically extrusions, and they may be either metal or plastic. They usually include at least some kind of internal features to engage a cover, and may include specific structures to facilitate mounting of the channel on an external surface or mount. The channel 12 of FIG. 1 is the SQUARE™ channel sold by Elemental LED, Inc. of Reno, Nev., United States. More specifically, the channel 12 is an anodized aluminum extrusion in which first and second vertical sidewalls 20, 22 are spaced apart by a bottom 24 to form an open upper compartment. The linear lighting 14 is installed on the bottom 24, typically with pressure-sensitive adhesive preinstalled on its underside, although a separate strip of pressure-sensitive adhesive may be installed in some cases between the bottom 24 and the linear lighting 14 if the linear lighting 14 is not already provided with adhesive. The linear lighting 14 is horizontally centered on the bottom 24 in the view of FIG. 1, although other positions are possible. Upper interior edges of the sidewalls 20, 22 carry engaging structure 26, which is typically used for engaging a cover. The channel 12 of FIG. 1 also includes a lower compartment, in the form of a T-slot 28 that is under and opposite the bottom 24 of the upper compartment. The T-slot 28 is provided to allow the channel 12 to mount to an external mount. Of course, the arrangement of the channel 12 may vary from embodiment to embodiment.

Figure 2:
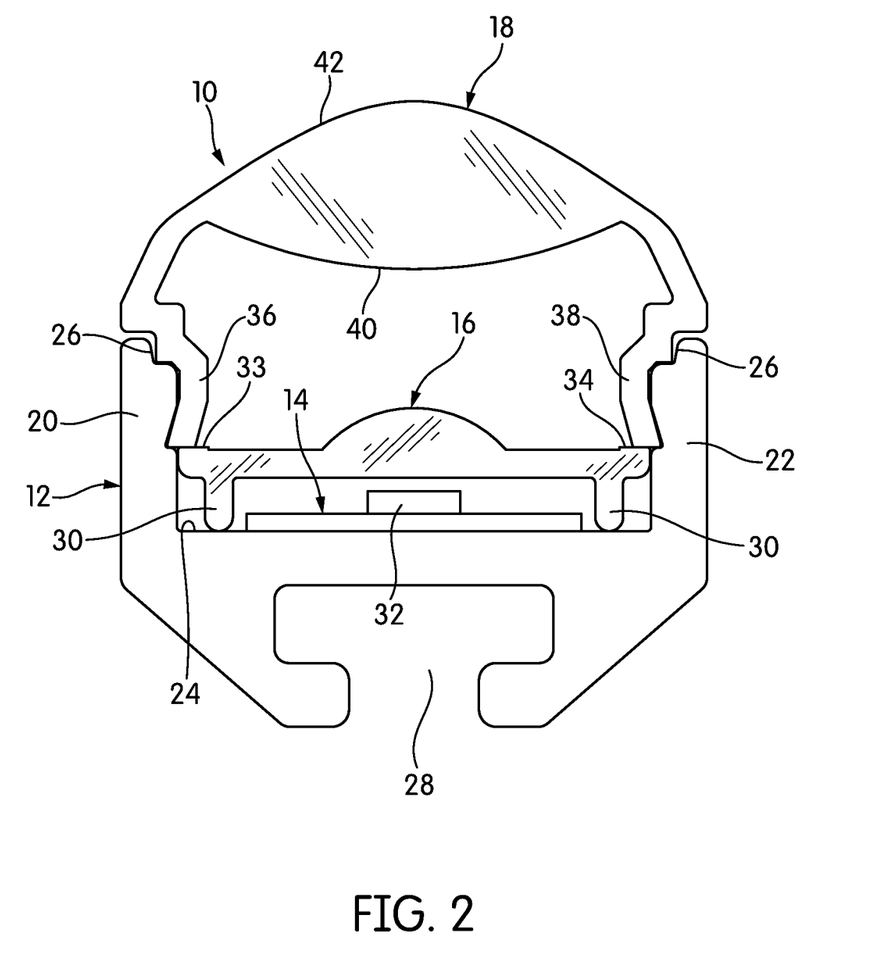
FIG. 2 is an end elevational view of the optical system of FIG. 1.

As is shown in FIG. 1 and in the end-elevational view of FIG. 2, in the optical system 10, the first lens 16 sits on the bottom 24 using two continuous, depending feet 30 that contact the bottom 24 proximate to the two sidewalls 20, 22. The first lens 16 is wider than the linear lighting 14 and is positioned such that the feet 30 rest to the left and right of the linear lighting 14 itself. The feet 30 of the illustrated embodiment have rounded bottoms, although in other embodiments, the feet 30 may be squared-off at their bottoms. Essentially, the optically-active portion of the first lens 16 is integrated into a platform that is suspended above the linear lighting 14. As will be set forth below in greater detail, the first lens 16 is preferably at close proximity to the linear lighting, while the second lens 18 is preferably spaced from it.

In addition to providing a lens directly over the LED light engines 32 of the linear lighting 14, the upper left and right extents of the first lens 16 provide platforms 33, 34 by which the second lens 18 is at least partially supported. Specifically, in the illustrated embodiment, the second lens 18 has leg portions 36, 38 that are canted outwardly and have squared-off bottoms. As shown, the bottoms of the leg portions 36, 38 rest partially in the engaging structures 26 provided by the channel 12 and partially on the platforms 33, 34 provided by the first lens 16. In the illustrated embodiment, the platforms 33, 34 are simply level, slightly raised plateaus on the upper side of the first lens 16; however, the first lens 16 and the leg portions 36, 38 of the second lens 18 may define complementary interlocking or engaging structures in some embodiments. The leg portions 36, 38 may include dark colorant or other such additives in order to prevent light from escaping. In some cases, the leg portions 36, 38 may be co-extruded with the optically-active portion of the second lens 18, so that they can be formed of a different material, or a material with light-blocking colorant.

The channel 12—and most channels of its type—are designed for only a single cover or lens that engages the channel 12 at the tops of the sidewalls 20, 22. One particular advantage of the optical system 10 is that it allows the channel 12 to accommodate and use two lenses 16, 18. Simply put, the use of two lenses allows for more control over the light emitted by the linear lighting 14 with a lower profile for the finished product—that is, because of the first lens 16, the second lens 18 need not be as far away from the linear lighting 14. Additionally, the features of the optical system 10, and particularly the way in which the first lens 16 supports the second lens 18, allow the optical system 10 to be retrofit to a variety of existing channels without requiring the channels 12, which are typically the more expensive components, to be redesigned.

Figure 3:
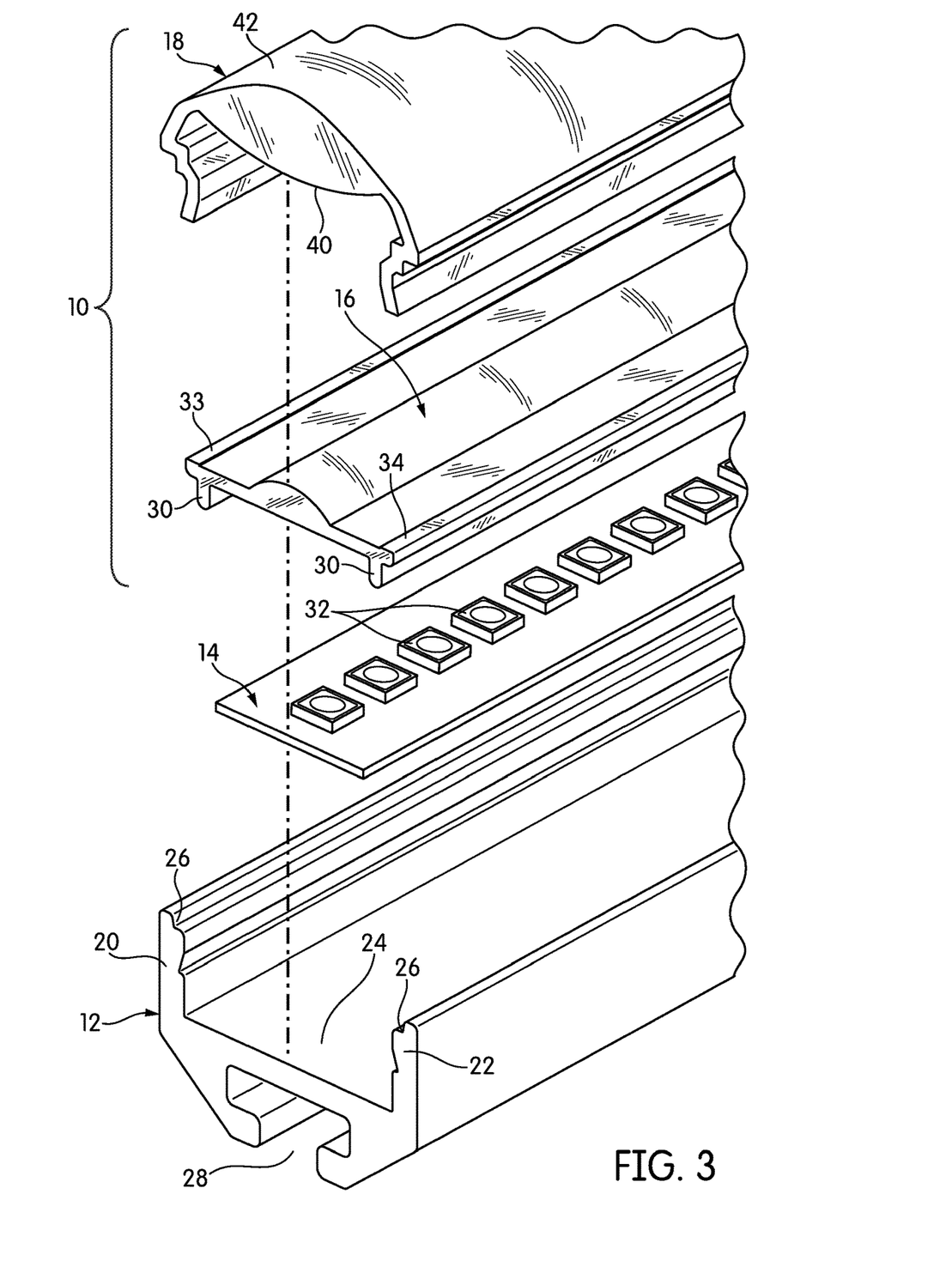
FIG. 3 is an exploded perspective view of the optical system of FIG. 1.

FIG. 3, an exploded perspective view, illustrates the arrangement: the linear lighting 14 is installed on the bottom 24 of the channel, typically horizontally centered. The feet 30 of the first lens 14 rest on the bottom 24, placing the first lens 14 itself over the linear lighting 14 and a short distance it. The second lens 18, which also acts to cover the channel 12, rests on the first lens 14 as well as engaging the structure 26 of the channel 12.

The materials of which the lenses 16, 18 are made may vary from embodiment to embodiment. Any material that has a refractive index higher than that of air and that is flexible enough to mount in the channel 12 may be used. Typically, the lenses 16, 18 will be made of a plastic, like polycarbonate, poly(methyl methacrylate), thiourethane, or the like. Plastic materials may include various modifiers, including impact-strength modifiers. For example, an impact-modified acrylic such as CA-924 (Plaskolite, Inc., Columbus, Ohio, United States) may be used.

Typically, the lens material will have a refractive index of at least 1.4, and may have a refractive index of 1.6-1.7 or higher if a high-index optical lens plastic is used. The lenses 16, 18 will typically be extruded in lengths of several feet or meters, but shorter sections may be cast or injection molded, for example, instead of being extruded. Optical systems 10 according to embodiments of the invention may be used in channels that are designed for immersive use in water or other liquids, but in that case, in addition to the ingress protection considerations, the materials of the optical system 10 should have higher indices of refraction than that of water or the liquid in which the system 10 is to be immersed. It should be understood that while the first lens 16 and the second lens 18 will often be made of the same material, they need not be.

The purpose of optical systems 10 according to embodiments of the invention will vary from embodiment to embodiment. In some embodiments, the optical system 10 may widen the beam of emitted light; in other embodiments, the optical system 10 may narrow the beam of emitted light. In yet other embodiments, the optical system 10 may have other purposes altogether.

In the illustrated embodiment, the first lens 16 and the second lens 18 are essentially an Abbe condenser system. Specifically, the first lens 16 is a plano-convex lens, and the second lens is a biconvex lens. Essentially, the first lens 16 fills the aperture of the second lens 18, i.e., the optically-active portions of the two lenses 16, 18 are optically aligned such that light from the first lens 16 is received by the second lens 18. The purpose of the optical system 10 is to produce a narrower light beam. In some cases, the non-optically-active portions of the two lenses 16, 18 may be dyed or otherwise darkened so that less light escapes the optical system 10.

In one embodiment, the optically active portion of the first lens 16 has a width of 6.6 mm, a thickness of 1.4 mm, and a radius of curvature of 4.4 mm. The second lens 18 has a maximum thickness of 6 mm. In the second lens 18, the inner surface 40 of the optically active portion is spherical with a radius of curvature of 17 mm; the outer surface 42 is non-spherical, defined by Equation (1) below:

$$z = \frac{-0.165x^2}{\sqrt{1 + 0.0408375x^2}} \quad (1)$$

The optical system 10 as a whole has a numerical aperture of 0.8. The first lens 16 essentially fills the aperture of the second lens 18.

Figure 4:
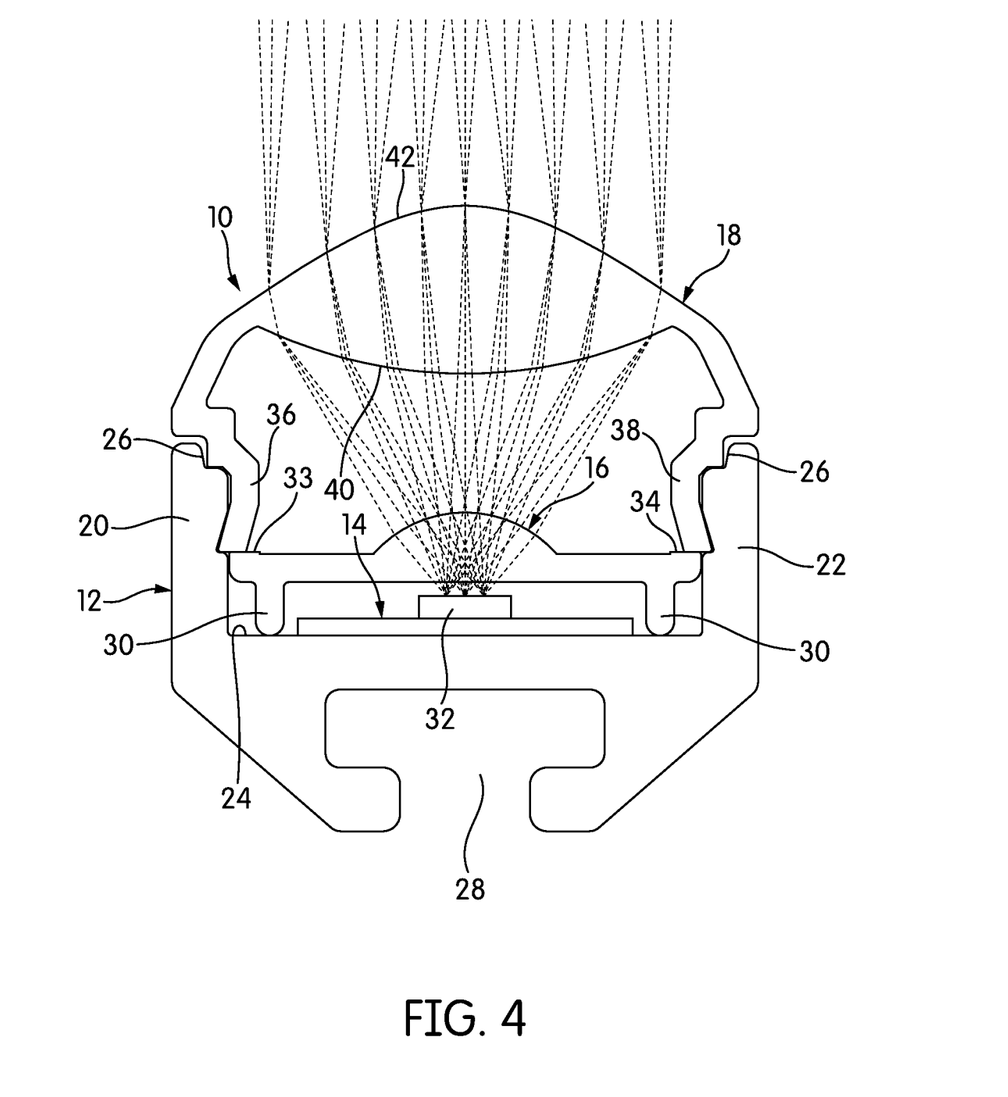
FIG. 4 is an end elevational view similar to the view of FIG. 2, illustrating an optical ray trace for the system.

FIG. 4 is a side elevational view of the optical system 10 and channel 12 with a ray trace overlaid, illustrating the disposition of light rays emitted by the linear lighting 32. Overall, this particular optical system 10 produces a narrower light beam from the linear lighting 32. For example, the optical system may produce a beam angle of 10°, full-width, half-maximum. As shown in FIG. 4, the first lens 16 collects the emitted light; the second lens 18 collimates it.

Beam angles are specified in many different ways. Beam angles for purposes of this description refer to full-width, half-maximum beam widths. "Full-width" means that the full width of the beam is measured, e.g., a 10° beam extends 5° on either side of the centerline. "Half-maximum" means that the intensity of the beam at each of the edges is half of the maximum intensity of the beam.

Figure 5:
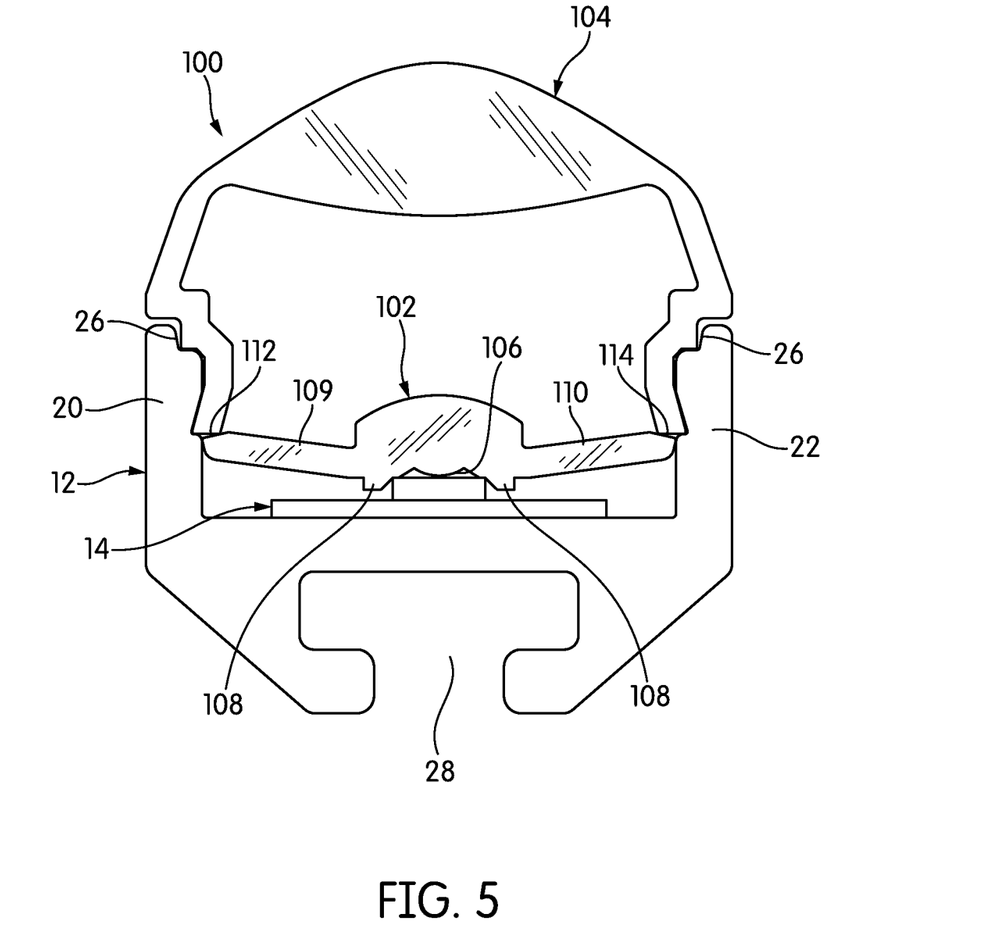
FIG. 5 is an end elevational view of an optical system according to another embodiment of the invention.

FIG. 5 is an end elevational view of an optical system, generally indicated at 100, according to another embodiment of the invention. The optical system 100 rests in a channel 12 that may be assumed to be the same as that described above overtop linear lighting 14. In the view of FIG. 5, the optical system 100 includes a first lens 102 close to the linear lighting 14 and a second lens 104 more removed from the linear lighting 14. The second lens 104 may be considered to be identical to the second lens 18 of the optical system 10 described above.

In contrast to the optical system 10 described above, the first lens 102 of the optical system 100 is a biconvex lens that rests directly on the light engines 32. The lower surface 106 of the first lens 102 is sized specifically for the emitting area of the light engines 32. A pair of flat feet 108 may rest on the linear lighting 14 immediately adjacent to the light engines 32. The biconvex first lens 102 in essence tries to fill the aperture of the second lens 104 with the emitted light from the center of each LED light engine. Light rays emitted closer to the edge of each light engine are refracted inwardly. As will be explained below in more detail, this may have some effect on color mixing.

The first lens 102 engages with the second lens 104 and the channel 12 slightly differently than the first lens 16 described above. Left and right wings 109, 110 extend outward from the center lens portion of the first lens 102, toward the sidewalls 20, 22 of the channel 26. Canted slightly upward, the wings 109, 110 provide platforms 112, 114 that partially support the legs 36, 38 of the second lens 104.

In the embodiments described above, lenses alone are used to produce the desired beam control and optical effects. As those of skill in the art will realize, there are situations in which it may be useful to modify the light in other ways. For example, the above description assumes that the emitted light is uniform across the light engine 32. However, an actual light engine may emit non-uniformly across its emitting area. In some cases, the variations may be random; in other cases, the variations may be in the form of a gradient or gradients. In general, light engines may experience variations or gradients in both intensity and color. Variations or gradients in color may be especially common when a phosphor is used, and may be particularly noticeable in optical systems that include only lenses—color mixing issues may create noticeable halos in the output light at the second lens.

The biconvex first lens 102 described above, and other such optical solutions, may have some effect on the color gradient issue, although optical solutions may not address the problem satisfactorily in all embodiments.

In cases of non-uniform light emission, diffusion may be used to mix the emitted light to ensure more uniformity. "Diffusion" and "diffusing effects," as those terms are used here, refer to the spreading or scattering of transmitted or reflected beams of light, typically by transmission through (and refraction by) a non-uniform medium or refraction at a surface or interface between two dissimilar materials. In a multiple-lens system, like those described here, either or both lenses may have diffusing features, although if the intention is to produce a narrow beam (e.g., 10°, full-width, half-maximum) it may be particularly beneficial if the lens closest to the light has diffusing features, so that the light is mixed as close to the source as possible.

Figure 6:
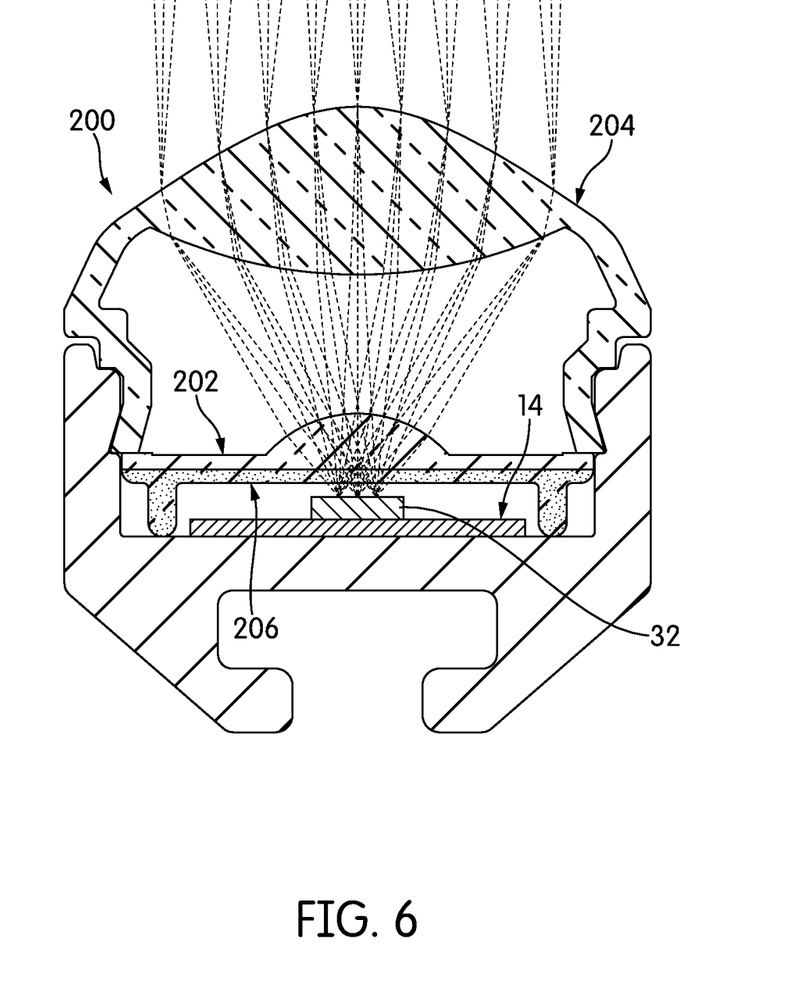
FIG. 6 is an end elevational view of an optical system according to yet another embodiment of the invention, illustrating an optical ray trace for the system.

FIG. 6 is a cross-sectional view of an optical system, generally indicated at 200, that illustrates the use of diffusion. The optical system 200 is generally similar to the optical system 10 described above; therefore, any component not described here may be assumed to be similar to its counterpart above. The optical system 200 includes a first lens 202 and a second lens 204. In the first lens 202, the underside 206 is comprised of a plastic that has one or more diffusing additives in it. Thus, the light from the light engine 32 is diffused immediately as it passes through the first lens 202.

The first lens 202 could, for example, be co-extruded, with the diffusing material and the clear plastic of the lens formed at the same time. Alternately, the diffusing material could be applied in a second process step in the form of a liquid coating which would then be cured on the first lens 202. In yet other cases, the diffuser may be entirely separate from the first lens 202 and the second lens.

Various types of additives are used to create diffusing materials. In simple cases, dyes and colorants are added to plastics like polycarbonate and acrylic in order to create diffusing covers. These types of additives may be used in some embodiments of the invention, and produce their effects primarily through opacity.

However, it may be advantageous to use diffusing additives that produce their effect refractively. They typically have a high index of refraction as compared with the base plastic or other material. For example, silica, fumed silica, or titanium dioxide microspheres in a base material of acrylic or polycarbonate may be particularly suitable in some embodiments.

Figure 7:
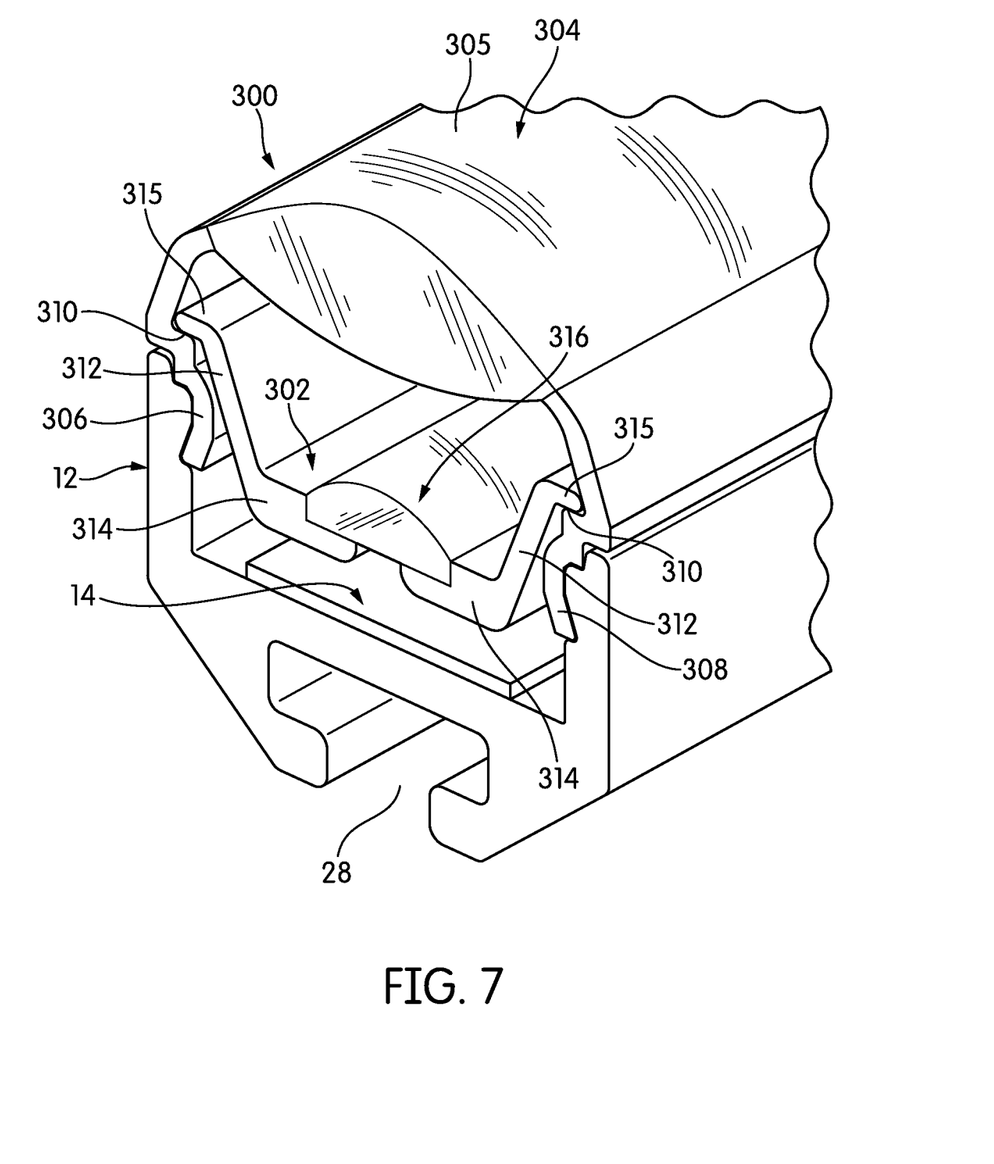
FIG. 7 is a perspective view of an optical system according to a further embodiment of the invention.

FIG. 7 is a perspective view of an optical system, generally indicated at 300, according to another embodiment of the invention. The optical system 300 is shown installed in a channel 12 with linear lighting 14. The optical system 300 is also a two-lens system, with a first lens 302 close to the linear lighting 14 and a second lens 304 spaced and receiving light from the first lens 302.

In the optical system 300 of FIG. 7, the arrangement of the first lens 302 and the second lens 304 is different than in the optical systems 10, 100, 200 described above. Specifically, the first lens 302 is supported by the second lens 304. Unlike in the embodiments described above, the first lens 302 is not supported by the bottom 24 of the channel 12. While this feature is shown with respect to the optical system 300 of FIG. 7, it may also be used in the optical systems 10, 100, 200 that are described above.

In this arrangement, the second lens 304 has features that are similar to the second lenses 18, 104, 204 described above. It is adapted to cover and close the channel 12, and includes depending leg portions 306, 308 that are adapted to engage the cover-engaging structure of the channel 12. Toward the top of each leg portion 306, 308, the first lens 304 forms an inwardly-extending ledge 310.

The first lens 302 has upwardly-extending leg portions 312 that turn outward to terminate in narrow, substantially horizontal lips 315. The lips 315 of the first lens 302 are sized and otherwise adapted to rest on, and be supported by, the ledges 310 of the second lens 304. Of course, this is only one possible way of engaging the first lens 302 with the second lens 304; other complementary engaging structure may be used. For example, the second lens could have sets of grooves, and the leg portions of the first lens could be constructed and arranged with structure that fits within those grooves.

Figure 8:
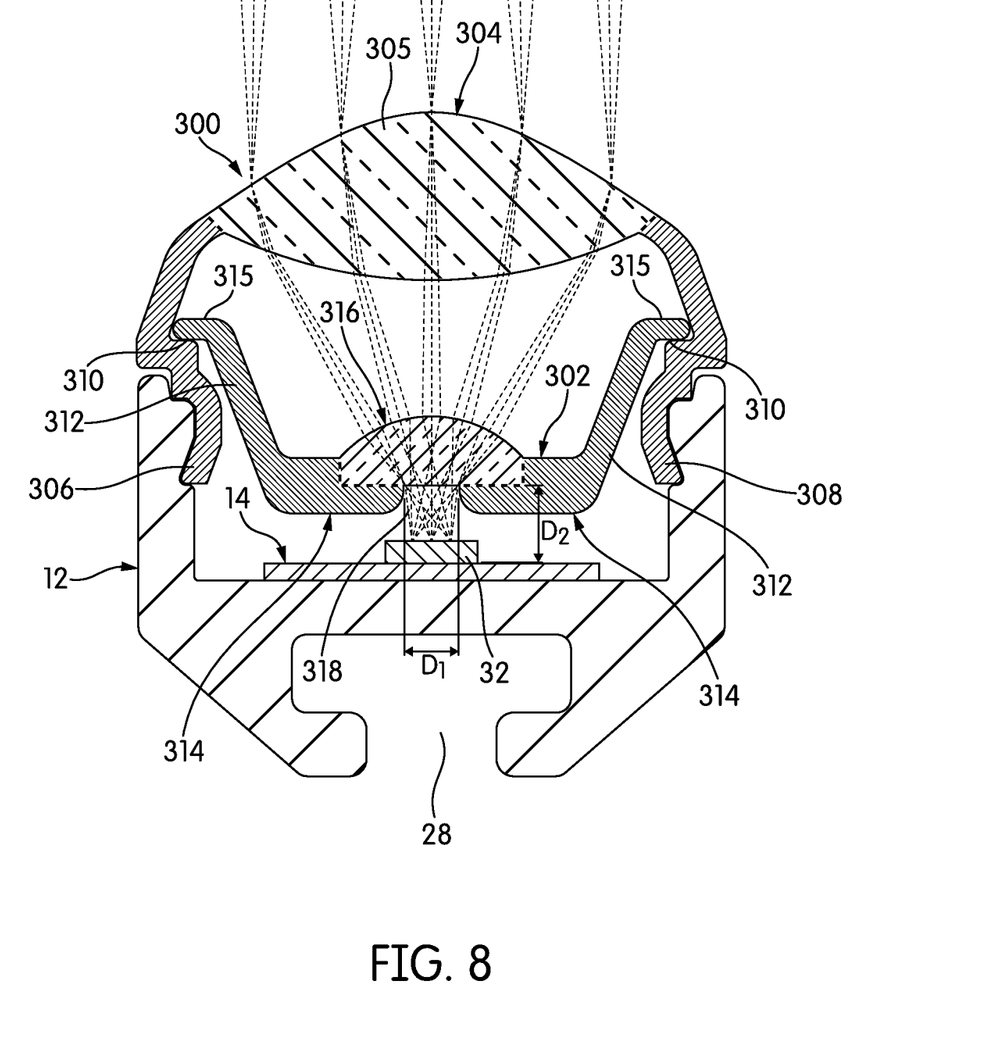
FIG. 8 is a cross-sectional view of the optical system of FIG. 7.

The optical system 300 of FIG. 7, which is intended to produce a narrow beam of light (e.g., 10° full-width, half-maximum) also takes a different optical approach than the optical systems 10, 100, 200 described above. FIG. 8 is a cross-sectional view of the optical system 300. As shown in FIG. 8, the first lens 302 is divided into three different, integral parts: two supports 314 and an optically-active portion 316. The supports 314 are mirror-images of one another, and diverge upwardly into the leg portions 312 that were described above. The optically-active portion 316 lies overtop the two supports 314. In the illustrated embodiment, the two supports 314 are co-extruded with the optically-active portion 316, so that the three components 314, 316 are integral. In other embodiments, the parts may be manufactured separately and adhered together, solvent bonded, heat fused, or joined together in some other way.

As can also be seen in the view of FIG. 8, the supports 314 are completely opaque. In this embodiment, they are a light-occlusive black color. The optically-active portion 316 is the only transparent, intentionally light-transmissive portion of the first lens 302. Moreover, the supports 314 overlap and occlude the edges of the optically-active portion 316, leaving only a narrow slit 318 through which light can pass from the light engines 32 through the first lens 302. The slit 318 has a width $D_1$. The width $D_1$ will depend on the desired beam width, among other factors. In one embodiment, for a 10° full-width, half-maximum beam width, the width $D_1$ may be 2 mm.

The first lens 302 of the optical system 300 extends down to a distance $D_2$ from the light engines 32, measured from the light engines 32 to the first surface of 316. In the illustrated embodiment, that distance may be, e.g., 2 mm. The optically-active portion 316 of FIGS. 7-8 is a plano-convex lens, with the planar surface facing the light engines 32. Optically, the second lens 304 may have the same profile as the second lens 18 described above.

In the illustrated embodiment, the leg portions 306, 308 of the second lens 304 are also a light-occlusive black color, and serve to prevent light from escaping through the sides of the second lens 304. The second lens 304 may be co-extruded, such that its optically-active portion 305 is formed with the black-colored leg portions 306, 308. The portions 305, 306, 308 may, e.g., be made of the same material, such as an acrylic plastic, with a colorant or additive in the plastic used for the leg portions 306, 308.

The overall effect of the optical system 300 of FIGS. 7-8 is to produce a beam with a narrow width, e.g., 10°, full width, half maximum. If a wider beam is desired, the optical system may be different. For example, while the first lens 302 has an optically-active portion 316, there need not be such a structure in all embodiments. The supports 314 could merely form a light-transmissive slit that allows light to pass with no lens. Alternatively, a diffuser could be provided instead of a lens.

The optical systems of FIGS. 1-8 each attempt to create a relatively narrow beam of light, e.g., on the order of 10° beam width. Optical systems that produce wider beams, e.g., 30°, 45°, 60°, etc., are also useful and may be desirable in various applications. If the beam is to be wider, a first lens close to the light engines 32 that focuses the emitted light may not be necessary; it may be possible to produce that beam width using only a single lens placed atop the channel 12. However, if the light engines 32 include phosphor or other such elements that produce color variations, a diffuser prior to that lens may still be helpful.

Figure 9:
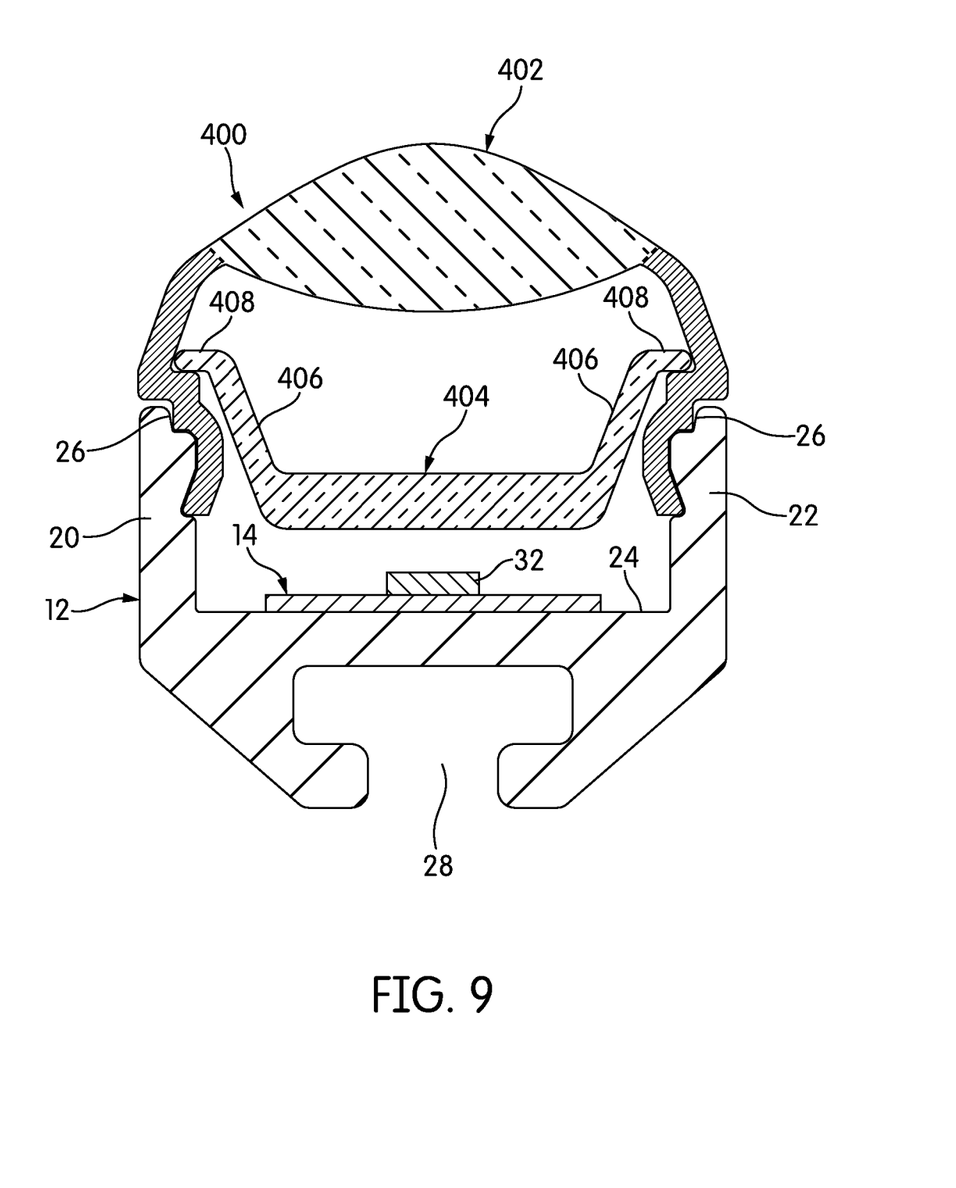
FIG. 9 is a cross-sectional view of an optical system according to another further embodiment of the invention.

FIG. 9 is a cross-section of an optical system, generally indicated at 400, according to another embodiment of the invention. The optical system 400 includes a single lens 402 with the properties of the second lens 18, 104, 204, 304 described above. However, there is a second optical element in the optical system 400: a diffuser 404 positioned between the linear lighting 14 and the lens 402.

Here, the term "optical element" refers to an element that receives light from the light engines 32 and modifies that light in some way. An optical element may be a lens, but the term broadly encompasses both lens and non-lens elements, as may be apparent from the description of the diffuser 404 as an optical element. As with the term "lens," the terms "optical element" and "diffuser," as used here, refer to the entire structure unless otherwise noted, even if only a portion of that structure actually receives and modifies light.

The diffuser 404 includes the same upwardly-extending legs 406 and horizontal lips 408 as are found on the first lens 302 described above. The lips 408 engage with the ledges 410 of the lens 402 in the same manner.

The diffuser 404 may be constituted of the same kinds of materials described above with respect to other embodiments, e.g., acrylic plastic with a diffusing material, such as titanium dioxide microspheres, included. As those of skill in the art will understand, beyond the inclusion of a diffusing material in the diffuser, the presence of the diffuser itself has a refractive effect on the light emitted by the linear lighting 14.

In the embodiment of FIG. 9, the entirety of the diffuser 404 is light-transmissive; there are no blackened or light-occlusive portions. However, in other embodiments, a diffuser may include blackened or light-occlusive portions, such as its legs 406. If light-occlusive portions are used in a diffuser, they may have the effect of forming a light-transmissive slit, such as the slit 318 of FIGS. 7-8.

Figure 10:
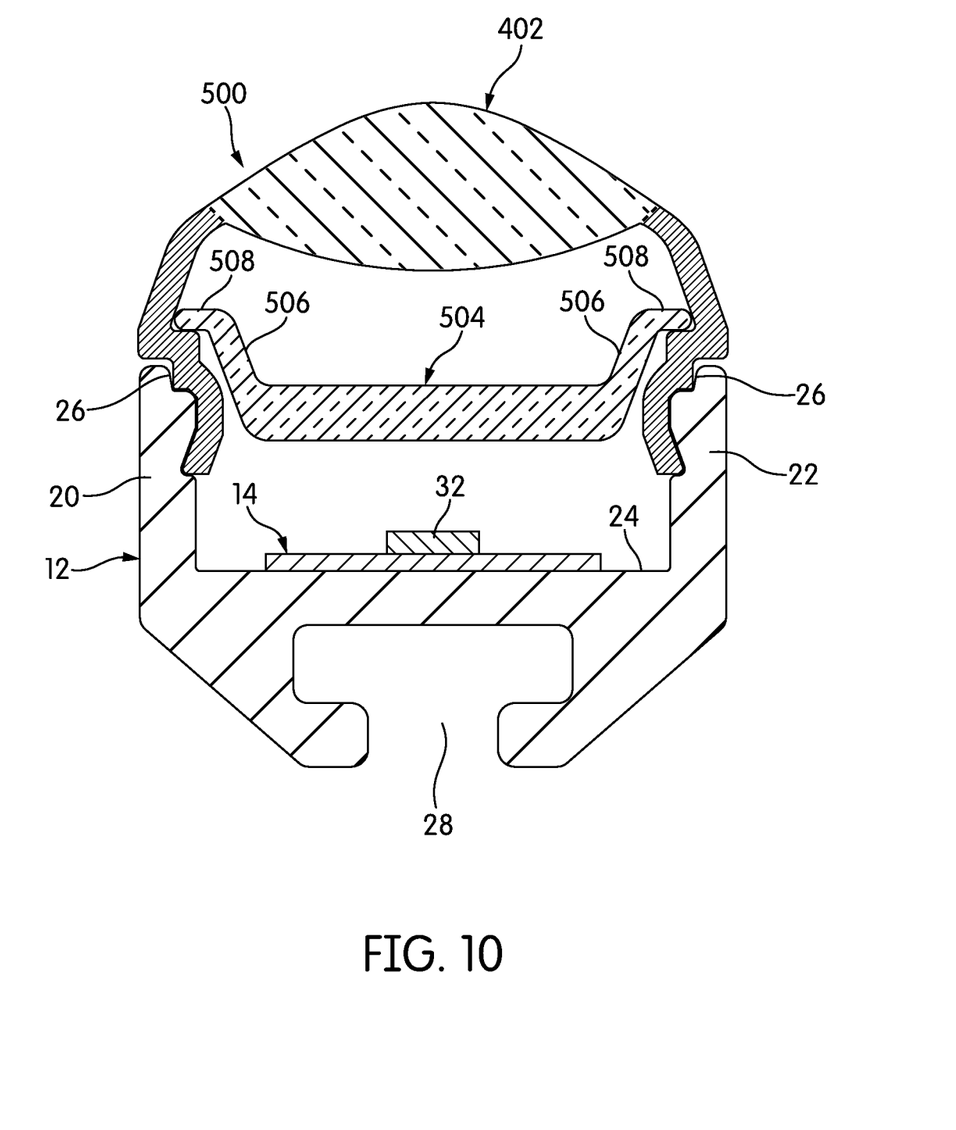
FIG. 10 is a cross-sectional view of an optical system according to yet another further embodiment of the invention.

The optical system 400 of FIG. 9 may be used to produce a beam of light with a beam width of 30°, full width, half maximum. FIG. 10 illustrates an optical system 500 that is intended to produce a beam width of 45°, full width, half maximum. The optical system 500 is similar or identical to the optical system 400 of FIG. 9 in most respects, including a lens 402 and a diffuser 504 between the linear lighting 14 and the lens 402. As can readily be appreciated from comparing FIGS. 9 and 10, the primary difference between the two optical systems 400, 500 lies in the diffuser 504. Specifically, the diffuser 504 has shorter legs 506. The shorter legs 506, which terminate in lips 508, place the diffuser 504 farther away from the linear lighting 14 and closer to the lens 502 than in the optical system 400. As one example, the surface of the diffuser 504 that faces the linear lighting 14 may be placed at a distance of 3.3 mm from the light engines 32 to produce a 45° beam width, versus a distance of 1.6 mm from the light engines 32 to produce a 30° beam width with the diffuser 404 of FIG. 9. This distance may be varied further to produce other beam widths.

As may be apparent from the above description and figures, many of the optical systems 10, 100, 200, 300, 400, 500 described above rely on at least some small, tightly-toleranced features, in particular the features that allow the second lens 18, 104, 204, 304 to engage with the channel 12, and the features that allow the first lens 304 or diffuser 404, 504 to engage with and be carried by the second lens 304, 404, 504. However, these features and functions may be implemented in any number of ways, and the arrangements described above and shown in the figures may be adapted, especially if adaptation is necessary to meet manufacturing tolerances for a particular manufacturing technique or process, like extrusion.

Figure 11:
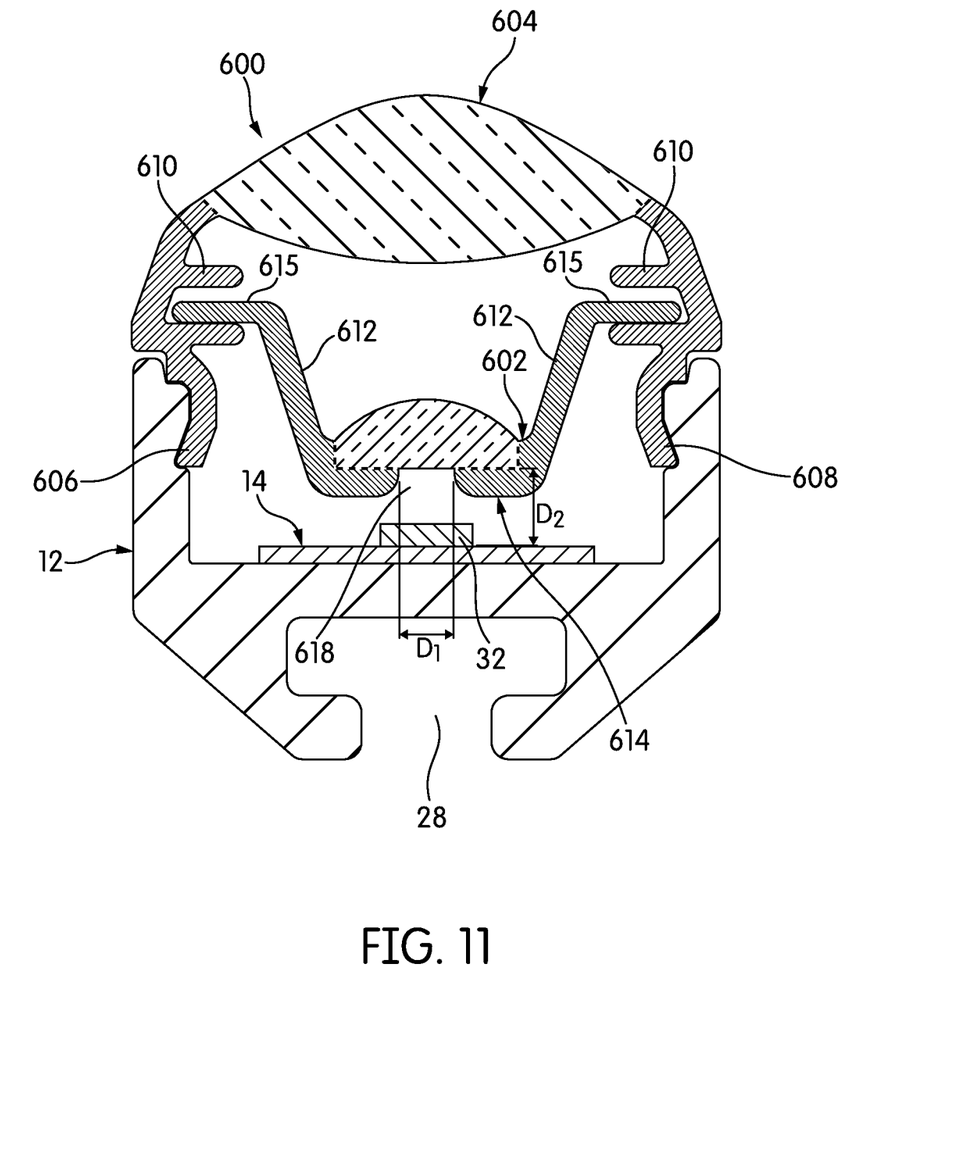
FIG. 11 is a cross-sectional view of an adaptation of the optical system of FIGS. 7 and 8.

FIG. 11 is a cross-sectional view of an optical system 600 that is similar in most respects to the optical system 300 of FIGS. 7 and 8. There is a first lens 602 that is supported by a second lens 604 to hang close to the light engines 32 of a strip of linear lighting 14. For a 10° beam width, the slit width $D_1$ and the gap height $D_2$ between the light engines 32 and the first lens 602 may be the same as in the optical system 300.

Instead of ledges 310, the second lens 604 defines a pair of interior channels 610. The upwardly-extending leg portions 612 of the first lens 602 terminate in lips 615 that are adapted to rest in the channels 610.

The optical system 600 also has a number of changes in proportion relative to the other optical systems. The leg portions 606, 608 of the second lens 604 are thinner than their counterparts in other embodiments. The support 614 of the first lens 602 is slightly narrower, but still covers the LED light engine 32. These differences in proportions may accommodate different manufacturing tolerances. Notably, despite the differences, optical spacings and lens characteristics are generally preserved.

The optical systems described above may ultimately be used to modify the light output from linear lighting in a variety of ways. Although the embodiments described above narrow or focus the emitted light, other embodiments may modify the light in other ways. It should be understood that while lenses and other optical elements of specific types are shown and described above, optical systems according to embodiments of the invention may have more than two lenses. If there are more than two lenses or optical elements, those lenses may be arranged and supported in a variety of ways.

One particular advantage of the multiple-lens and multiple-element optical systems is modularity. Notably, all of the optical systems 10, 100, 200, 300, 400, 500, 600 use the same, or nearly the same, second lens or element covering the channel 12. This means that a variety of beam widths/angles and optical effects can be achieved by substituting different first lenses or elements.

Of course, although modularity can be advantageous, it need not be the case in all embodiments. For example, while the first and second optical elements are described as being separate from one another in the optical systems 10, 100, 200, 300, 400, 500, 600 described above, they could be made as a single integral piece, either by manufacturing them as one piece (e.g., a single extrusion or co-extrusion) or by joining the separate pieces together in a second manufacturing operation by heat-bonding, adhesives, solvent bonding, or another such suitable joining technique.

While the invention has been described with respect to certain embodiments, the description is intended to be exemplary, rather than limiting. Modifications and changes may be made within the scope of the invention, which is defined by the appended claims.

What is claimed is:

1. An optical system for linear lighting, comprising:
   an outer optical element having mounting structure adapted to allow the outer optical element to be mounted on a channel to cover the channel; and
   an inner optical element constructed and arranged to depend from the outer optical element, the inner optical element having upwardly-extending leg portions, upper ends of the upwardly-extending leg portions having outwardly-extending, generally horizontal lips, the outer optical element and the inner optical element being optically aligned with one another such that light passes first through the inner optical element and then through the outer optical element;

wherein the inner optical element and the outer optical element are elongate with constant cross-sections.

2. The optical system of claim 1, wherein the outer optical element has inner ledges sized and adapted to receive and support the lips of the second optical element.

3. The optical system of claim 1, wherein the outer optical element has channels sized and configured to accept the lips of the inner optical element.

4. The optical system of claim 1, wherein the outer optical element has depending legs that are adapted to engage with the channel.

5. The optical system of claim 1, wherein the outer optical element is a lens.

6. The optical system of claim 5, wherein the inner optical element is a lens.

7. The optical system of claim 5, wherein the inner optical element is a diffuser.

8. The optical system of claim 1, wherein the inner optical element is suspended from the outer optical element.

9. An optical system for linear lighting, comprising:
an outer lens having mounting structure adapted to allow the outer lens to be mounted on a channel to cover the channel; and
an inner optical element separate from, suspended by, and depending from the outer lens, the inner optical element including a light-transmissive portion and light-occlusive portions arranged to block light, the inner optical element and the outer lens being optically aligned with one another such that light passes first through the inner optical element and then through the outer lens;
wherein the inner optical element and the outer optical element are elongate with constant cross-sections.

10. The optical system of claim 9, wherein the inner optical element comprises a lens or a diffuser.

11. The optical system of claim 9, wherein the light-occlusive portions define a slit that serves as the light-transmissive portion.

12. The optical system of claim 9, wherein the light-transmissive portion comprises a lens.

13. The optical system of claim 9, wherein the outer lens comprises a biconvex lens and the inner optical element comprises a plano-convex lens.

14. A luminaire, comprising:
a channel;
a strip of linear lighting disposed in the channel;
an outer lens having mounting structure adapted to allow the outer optical element to be mounted on the channel to cover the channel; and
an inner optical element separate from, suspended by, and depending from the outer lens, the inner optical element including a light-transmissive portion and light-occlusive portions arranged to block light, the outer lens and the inner optical element being optically aligned with one another and with the strip of linear lighting such that light produced by the strip of linear lighting passes first through the inner optical element and then through the outer optical element;
wherein the inner optical element and the outer lens are elongate with constant cross-sections.

15. The luminaire of claim 14, wherein the inner optical element comprises a lens or a diffuser.

16. The luminaire of claim 14, wherein the outer lens comprises a biconvex lens.

17. The luminaire of claim 16, wherein the biconvex lens comprises at least one aspherical surface.

18. The luminaire of claim 14, wherein the light-transmissive portion in the inner optical element comprises a slit flanked by the light-occlusive portions.

19. The optical system of claim 9, wherein the outer lens includes light-occlusive portions.

20. The optical system of claim 1, wherein the inner optical element includes a light-transmissive portion and light-occlusive portions arranged to block light.

21. The optical system of claim 1, wherein the outer optical element includes a light-transmissive portion and light-occlusive portions arranged to block light.

* * * * *